United States Patent [19]

Wagener et al.

[11] Patent Number: 4,985,511

[45] Date of Patent: Jan. 15, 1991

[54] SILOXANE-POLYPIVALOLACTONE THERMOPLASTIC ELASTOMERS

[75] Inventors: Kenneth B. Wagener, Gainesville, Fla.; Sirisoma Wanigatunga, Bridgewater, N.J.

[73] Assignee: University of Florida, Gainesville, Fla.

[21] Appl. No.: 362,937

[22] Filed: Jun. 8, 1989

Related U.S. Application Data

[63] Continuation-in-part of Ser. No. 236,731, Aug. 26, 1988, abandoned.

[51] Int. Cl.$^5$ ............................................ C08F 283/00
[52] U.S. Cl. ................................. 525/474; 528/26; 528/27
[58] Field of Search ................. 525/474; 528/26, 27

[56] References Cited

U.S. PATENT DOCUMENTS 4,808,649  2/1989  Gay et al. ............................. 528/26

*Primary Examiner*—Melvyn I. Marquis
*Attorney, Agent, or Firm*—Kerkam, Stowell, Kondracki & Clarke

[57] ABSTRACT

Poly(siloxane-pivalolactone) thermoplastic elastomers and methods for their preparation by graft polymerizing pivalolactone onto a polysiloxane backbone.

14 Claims, 2 Drawing Sheets

SYNTHETIC SCHEME FOR POLY(SILOXANE)-POLY(POLY(PIVALOLACTONE) THERMOPLASTIC ELASTOMERS.

THERMOGRAMS FOR POLY(SILOXANE)-POLY(PIVALOLACTONE) CONTAINING 50 WT% POLY(PIVALOLACTONE: a) 1st HEATING CURVE AT 40°C/min.: b) COOLING CURVE AT 20°C/min. AFTER 1st HEATING; c) HEATING CURVE AT 40°C/min. AFTER FOUR HEATING CYCLES FROM 50 TO 310°C.

SILOXANE-POLYPIVALOLACTONE THERMOPLASTIC ELASTOMERS

RELATED APPLICATIONS

This is a continuation-in-part of application Ser. No. 236,731, filed Aug. 26, 1988 and now abandoned. Research resulting in the present invention was supported in part by the U.S. Army under contract No. DAAL 03-86-K-0050. The United States Government has certain rights with respect to the present invention.

BACKGROUND OF THE INVENTION

1. Field of the Invention

The present invention relates to certain novel thermoplastic elastomers and methods for their preparation.

2. Description of the Prior Art

Copolymer systems that are well separated can display elasticity without the requirement of crosslinking provided that one of the phases, often called the hard phase, is capable of a thermally reversible change of state. Such copolymers are known as thermoplastic elastomers and a large number of them exist [Legge et al., Eds., *Thermoplastic Elastomers, A Comprehensive Review*, N.Y., (1987)]. Examples of thermoplastic elastomers include: poly(styrene-dienestyrene)s and their blends [Porter et al., U.S. Pat. No. 3,149,182 (1964); Legge et al., "Chemistry and Technology of Block Copolymers" in *Applied Polymer Science*, Craver and Tess, Eds., ACS, Washington, D.C., p. 394 (1975)]; polyolefins and their blends [Caran et al., Rubber Chem. & Tech., Vol. 56, p. 1045 (1983); Coran et al., Rubber Chem. & Tech., Vol. 56, p. 210 (1983); poly(urethane-ether)s [Oertel, Ed., Polyurethane Handbook, Carl Hanser Verlag, Munich (1985); poly(amide) copolymers [Nelb et al., "Polyesteramides and polyetheresteramides: Thermoplastic polyamide Elastomers": in *Thermoplastic Elastomers, A Comprehensive Review*, Eds., Legge et al., N.Y. (1987)]; poly(ester) copolymers including those containing poly(pivalolactone) [Wolfe, "Elastomeric Poly(ester-ether) Block Copolymers" in *Block Copolymers: Science and Technology*, Eds. Meier, Harwood Academic, N.Y. (1983) 145]; ionomeric systems [Agarwal, U.S. Pat. No. 4,371,652 (1983); Lundberg et al., U.S. Pat. No. 4,481,318 (1984)]; acrylics [Falk et al., U.S. Pat. No. 4,473,679 (1984)], and poly(siloxane) copolymers. Several poly(siloxane) copolymers have been reported in the literature [Nyilas, U.S. Pat. No. 3,562,352 (1971); Riffle et al., J. Macromol. Sci., Chem., A15, p. 967 (1981); Gaylord, U.S. Pat. No. 4,120,570 (1978); Saam et al., Ind. Eng. Chem. Prod. Res., Vol. 10, p. 10 (1971); Kania et al., J. Appli. Polym. Sci., Vol. 27, p. 139 (1982)]; and have the advantage that they can be used as elastomers at very low temperatures.

Reported copolysiloxanes include: poly-(siloxane)-poly(urethane)s; poly(siloxane)-poly (carbonate)s; poly(siloxane)-poly(methacrylate)s; poly(siloxane)-poly(amide)s; poly(siloxane)-methylstyrene block copolymers, and poly(siloxane)-polypeptide block copolymers.

In many practical applications the crystalline or semi-crystalline state in polymeric systems is highly preferred for thermally induced changes in state; however, very few of the known polysiloxane copolymers exhibit a crystalline or semi-crystalline phase. The crystalline state also enhances physical properties such as solvent resistance and ultimate strength.

It is an object of the present invention to provide novel semi-crystalline, thermoplastic siloxane elastomers.

It is a further object of the present invention to provide novel methods for preparing such elastomers.

SUMMARY OF THE INVENTION

The above and other objects are realized by the present invention which provides poly(siloxane-pivalolactone) thermoplastic elastomers.

The present invention also provides a method for preparing a poly(siloxane-pivalolactone) thermoplastic elastomer comprising copolymerizing an elastomeric polysiloxane containing a carboxylate salt group and pivalolactone in the presence of a medium which separates the cation well from said carboxylate anion and converts the carboxylate anion into an initiator for polymerization therewith of said lactone.

Finally, the present invention provides articles of manufacture comprising poly(siloxane-pivalolactone) thermoplastic elastomers.

DETAILED DESCRIPTION OF THE INVENTION

The poly(siloxane-pivallactone) thermoplastic elastomers of the present invention have the general formula:

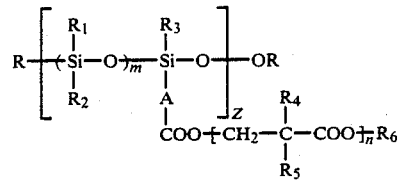

wherein: R is H, $-(CH_2)_x-COOH$, $-CH=CH_2$, $CH_3$, $C_6H_5$, $-C\equiv CH$,

$CF_3$ or $-(CH_2)_xNH_2$,

X is an integer in the range of from about 1 to about 3, $R_1$ and $R_2$ may be the same or different and are lower alkyl aryl $-CH=CH_2$,

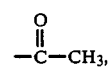

$-(CH_2)_yNH_2$, $CF_3$ or $CONH_2$, m is an integer in the range of from about 1 to about 50,000, $R_3$ is lower alkyl, aryl, $-CH=CH_2$

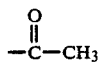

or —(CH$_2$)$_y$—NH$_2$,

A is alkylene having from 2 to 10 carbon atoms,

R$_4$ and R$_5$ may be the same or different and are lower alkyl, aryl, —CH=CH$_2$,

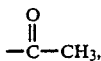

—(CH$_2$)$_n$NH$_2$, CF$_3$, —CONH$_2$.

R$_6$ is H, —CH$_3$—C$_2$H$_5$, y is an integer in the range of from about 1 to about 3, n is an integer in the range of from about 1 to about 50,000;

z is an integer in the range of from 1 to about 5000; or a salt thereof.

Preferred embodiments of the invention include those poly(siloxane-pivalolactone) thermoplastic elastomers of the above formula wherein R is H and/or R$_1$ and R$_2$ are each methyl or phenyl and/or R$_3$ is methyl and/or A is propylene, and/or R$_4$ and R$_5$ are each methyl and/or R$_6$ is H.

Figure 1:
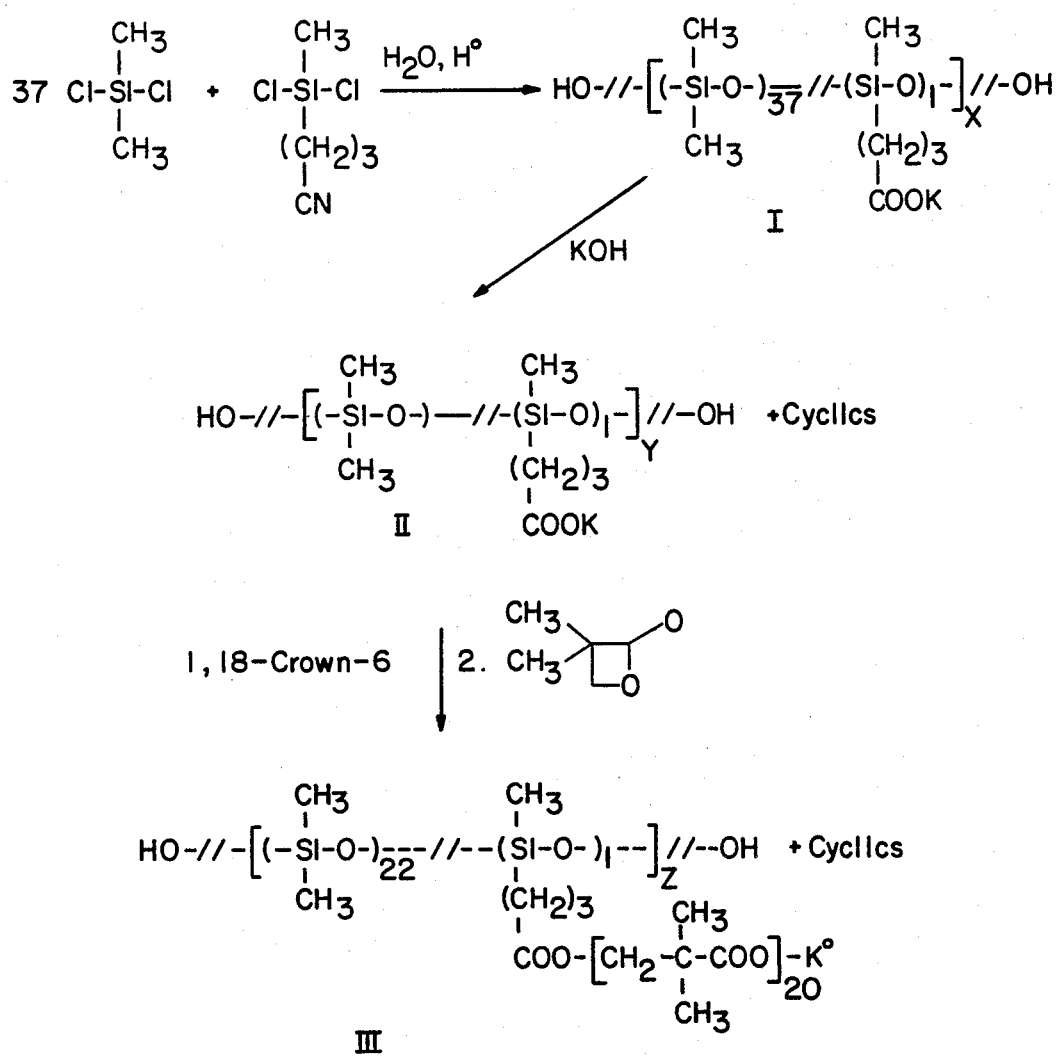
FIG. 1 depicts a reaction scheme for preparing the products of the invention.

The above poly(siloxane-pivalolactone) thermoplastic elastomers may be synthesized according to the reaction scheme depicted in FIG. 1.

The carboxylate salt group containing polysiloxane grafting backbone may be prepared according to methods well-known in the prior art. See Katayana et al., Macromol. Chem., Rapid. Comm., Vol. 7, p. 153 (1986). The polysiloxane is then preferably co-polymerized with pivalolactone in a suitable solvent, e.g., a tetrahydrofuran/acrylonitrile mixture, tetrahydrofuran/methylene chloride mixture, acrylonitrile/methylene chloride mixture, tetrahydrofuran/toluene mixture, etc. containing a medium which separates the cation well from the carboxylate anion of the polysiloxane and converts the latter to an initiator for copolymerization therewith.

Suitable such media include 18-crown-6, 15-crown-5 and 12 crown-4, etc.

It is preferred, but not critically necessary, to conduct the copolymerization under an inert atmosphere such as argon, etc.

The copolymerization may be carried out at temperatures ranging from about 25° C. to about 50° C.

The above method may be employed to prepare a wide range of copolymers containing from about 30% to about 70%, by weight, of polypivalolactone. The properties of final copolymer are dependent upon the ratio of siloxane units to pivalolactone units, the length of the grafted chain, the spacing between graft sites and the molecular weight and distribution of the siloxane in the polymer.

The final copolymer product may be filtered from the reaction medium, washed with, e.g., diethyl ether to remove unreacted pivalolactone and dried.

The poly(siloxane-pivalolactone) thermoplastic elastomers of the present invention may be manufactured in the form of fibers, membranes, films or molded articles according to conventional polymer processing methods and may be used as membranes in manufacturing biomedical devices, tissue contacting elements and gas separation systems. They are also useful in preparing coating and adhesive compositions, high impact polyester compositions and composites.

The invention is illustrated by the following non-limiting examples.

EXAMPLE 1

Referring to FIG. 1, the requisite random copolysiloxane grafting backbone I, is prepared according to the method of Katayana et al., supra. In a typical preparation, I (4.5 g) in diethylether (450 ml) was shaken with 10M aqueous KOH (14 ml) for 5 minutes, and the ether layer was washed with water until it was neutral. The ether extract was evaporated, and the residue was dried under vacuum (yield 92%). The siloxane ratio in I depends on the time of reaction between the chlorosiloxanes and the reaction time used (20 hrs.) was such that the feed siloxane ratio was equal to the siloxane ratio in I.

In order to prepare a poly(siloxane)poly(pivalolactone) copolymer containing 50% poly(pivalolactone), the residue (2 gms) was placed in a 3-necked flask fitted with a mechanical stirrer, which was also connected to an argon supply and a vacuum pump. After evacuating the contents overnight, dry THF (8 ml) and 18-crown-6 (0.01 gms) were added under argon, and the contents were stirred to obtain a homogeneous solution. Freshly distilled pivalolactone (2 gm), was added under argon, and the contents were stirred further. The homogeneous solution became heterogeneous in 20 minutes, and stirring was stopped for a day. The product was washed well with diethyl ether to remove any unreacted pivalolactone, filtered, and dried under vacuum at room temperature. This method was also used to prepare a wide range of copolymer compositions containing 30, 40, 60, and to 70 percent poly(pivalolactone).

Concentrated aqueous KOH converted I to the copolysiloxane carboxylate anion II under two-phase reaction conditions. IR and GPC monitoring of the reaction confirmed the mechanism outlined in FIG. 1. The GPC chromatograms of I and II indicate some depolymerization of I, and the formation of some cyclics during the conversion, yet the molecular weight of II as determined by a polystyrene calibration was still high, exhibiting a value M$_{GPC}$=112,000. The yield of II was 92%, less than 100% since the cyclics formed evaporated under vacuum while drying. This is to be expected since siloxane bonds in the linear polymer and the cyclic species have similar reactivities, meaning that the formation of cyclic compounds is difficult to avoid. Similar situations, called "redistribution", or "equilibration reactions", have been reported in the past, and these reactions depend on a number of parameters that can be controlled [McGrath et al., "An Overview of the Polymerization of Cyclosiloxanes", *Initiation of Polymerization*, F. E. Bailey, Jr., Ed., ACS Symp. Series, Vol. 212, p. 150 (1983)].

Compound II was converted to the poly-(siloxane)-g-poly[pivalolactone), III, under anhydrous conditions, where!-n the conversion of pivalolactone to poly(pivalolactone) grafts was greater than 90%. The reaction became heterogeneous even before 10% conversion of pivalolactone, yet the pivalolactone polymerization continued, and a 24 hour period was sufficient to produce conversions of greater than 90%. Heterogeneous graft copolymerization of this nature are rare, and in this case the grafting of pivalolactone took place only in the presence of 18-crown-6. Crowns are known to complex with the potassium counterion, and thus render the carboxylate anion an efficient initiator for lactone polymerization. In control experiments, however, it was shown that the crown ether by itself did not polymerize pivalolactone. In another control experiment, it was shown that poly(dimethylsiloxane) possessing end silanol groups did not polymerize the lactone, indicating that the end silanol groups in II did not act as an initiator. This evidence confirms that hydroxy groups and water are much slower initiators than carboxylate anions for poly(pivalolactone) polymerization.

The product obtained after pivalolactone polymerization was extracted alternatively with m-cresol, a good solvent for homopoly(pivalolactone) and $CH_2Cl_2$, a good solvent for poly(siloxane). While no homopoly(pivalolactone) was extracted by m-cresol, about 5% low molecular weight siloxanes were extracted by $CH_2Cl_2$, yet the $^1H$ NMR of the extracted siloxanes showed that they did not contain any carboxy propyl groups. Therefore, it was evident that (a) any unreacted siloxane, I, was not extracted into $CH_2Cl_2$; (b) the extract consisted of cyclics; and (c) these cyclics did not contain any carboxypropyl containing siloxane units.

When the product obtained after pivalolactone polymerization was dissolved in a mixture of $CH_2Cl_2$ and hexafluoroisopropanol (90:10) and precipitated in ether, about 15% of the produce dissolved in the ether layer, and another 15% was extracted when the precipitation was repeated. In view of the above-mentioned "equilibration" or "redistribution" reactions, an estimate of the percent unreacted copolysiloxane is not possible.

After precipitation of the product from $CH_2Cl_2$/hexafluoroisopropanol, GPC analysis showed the presence of only one peak, indicating that grafting occurred and that the precipitate was not a polymer blend. The precipitate is the poly(siloxane)-poly(pivalolactone) graft copolymer, III, whose molecular weight, $M_{GPC}$, calculated using a polystyrene calibration was 177,000.

The $^{13}C$ NMR and $^1H$ NMR of III are consistent with the structures assigned in FIG. 1.

The ratio of poly(siloxane) to poly(pivalolactone) in III was calibrated using $^1H$ NMR, and the percent atomic concentrations, calculated on this basis, are as follows: C:47.15, Si: 16.98, H: 8.02, as compared to experimentally observed values: C: 47,30, Si: 17.49, H: 8.24.

Figure 2:
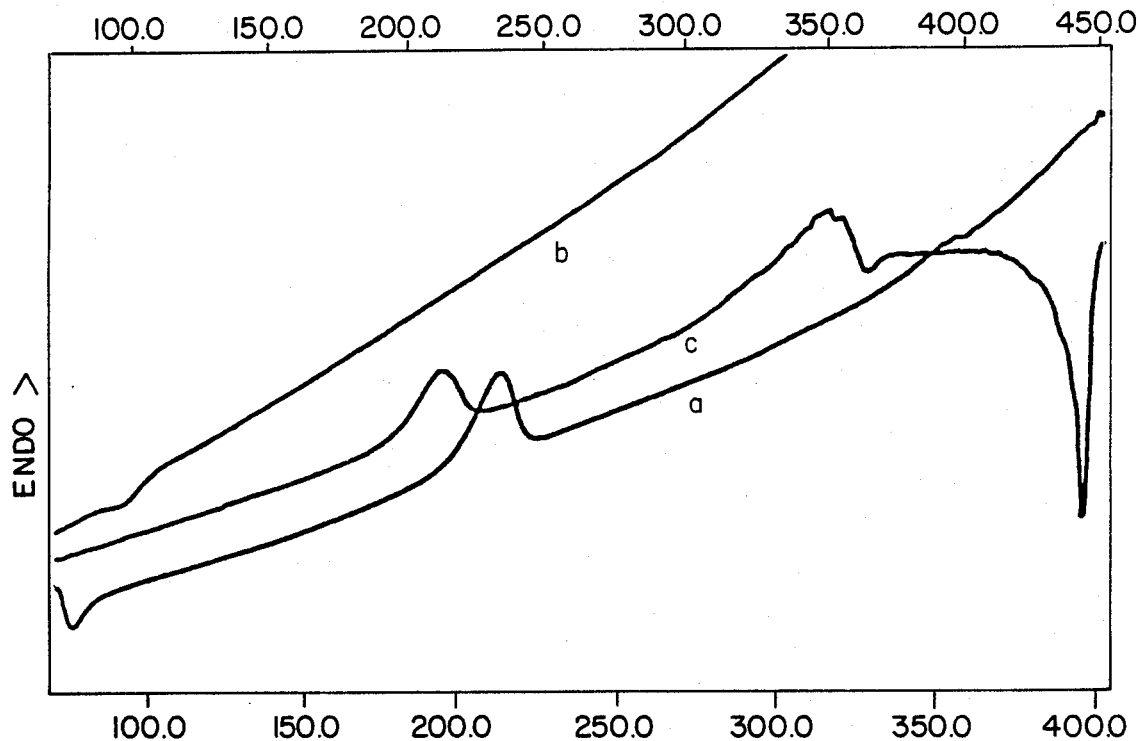
FIG. 2 depicts a thermogram for an embodiment of the invention.

Differential scanning calorimetry gave evidence for the thermoplastic behavior of these materials (FIG. 2). The samples used were the reaction product after pivalolactone polymerization and before removing any unreacted poly(siloxane). No homo poly(pivalolctone) was present in these samples. Curve "a" was obtained by heating a sample of poly-(siloxane)-poly(pivalolactone) containing 40% poly(pivalolactone) at 20° C. per minute without any prior treatment, and shows a melting temperature of 201° C. for the poly(pivalolactone) segment. Curve "b" was obtained by cooling that sample at 20° C. per minute, and crystallization of the poly(pivalolactone) segment occurred just below 100° C. When the sample was subjected to four heating cycles at 20° C./min. from 50° to 310° C., and then heated at 20° C./min., curve "c" was obtained. The endotherm around 200° C. due to poly(pivalolactone) segment was still evident in curve "c", however, the endotherm was slightly shifted to a lower temperature.

Table 1 shows the glass transition temperatures of poly(dimethylsiloxane) segments, $T_g$ (PDMS), and the crystalline melting temperatures of poly(pivalolactone) segments, $T_m$ poly(pivalolactone)s, calculated from DSC data of copolymers containing different weight percentage of poly(pivalolactone). A broad use temperature range is evident for all the compositions. For instance, the composition containing 30% poly(pivalolactone), which appeared to show better elastic behavior than the other compositions, has a use temperature range from −125° C. to about 200° C. The $T_g$ (PDMS) was the same as that of homo PDMS, and it did not vary with increasing poly(pivalolactone) content in the samples. Also, the melting temperatures observed for the poly(pivalolactone) segment in these compositions were very close to the melting temperatures of homo poly(pivalolactones) having comparable molecular weights. Therefore, it can be concluded that the phase separation in these systems is excellent.

TABLE 1

| DSC Date of Poly(siloxane)-Poly(pivalolactone) | | |
| --- | --- | --- |
| Poly(pivalolactone) Wt. % | T (PDMS), °C. | T, Poly(pivalolactone), °C. |
| 10 | −123 | 187.7 |
| 20 | −123 | 191.1 |
| 30 | −123 | 201.5 |
| 40 | −123 | 202.1 |
| 50 | −123 | 221.5 |

EXAMPLE 2

Cast samples of the products of the invention were prepared by casting the reaction product before extracting unreacted poly(siloxane) from a 10% solution in a mixture of methylene chloride hexafluoroisopropanol (90:10) and permitting the solvent to evaporate over 24 hrs. in a closed environment. The samples did not contain any homo poly(pivalolactone). As the poly(pivalolactone) content was increased, (i.e., as the graft length of the copolymer was increased), the size of the poly(pivalolactone) domains also increased.

The surface morphology was investigated using contact angle measurements. Underwater contact angles, measured in water with air bubbles, are shown in Table 2. Except for copolymers containing 70% poly(pivalolactone), all show a surface richer in poly(dimethylsiloxane). Annealing of the polymer samples should cause poly(pivalolactone) to better crystallize and cause more poly(dimethylsiloxane) to appear at the surface.

TABLE 2

| Contact Angle Measurements of Poly(siloxane)-Poly(pivalolactone) | |
| --- | --- |
| Poly(pivalolactone), Wt. % | Under Water Contact Angle |
| 0 | 91 |
| 10 | 90 |
| 20 | 86 |
| 30 | 90 |
| 40 | 89 |
| 50 | 89 |
| 70 | 50 |

We claim:

1. A poly(siloxane-pivalolactone) thermoplastic elastomer having the formula:

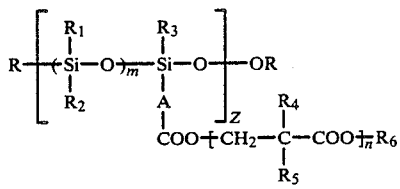

wherein:

R is H, —(CH$_2$)$_x$—COOH, —CH=CH$_2$, CH$_3$, C$_6$H$_5$, —C≡CH,

CF$_3$ or —(CH$_2$)$_x$NH$_2$,

X is an integer in the range of from about 1 to about 3,

R$_1$ and R$_2$ may be the same or different and are lower alkyl, aryl, —CH=CH$_2$,

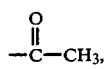

—(CH$_2$)$_y$NH$_2$, CF$_3$ or CONH$_2$, m is an integer in the range of from about 1 to about 50,000, R$_3$ is lower alkyl, aryl, —CH=CH$_2$,

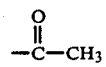

or —(CH$_2$)$_y$—NH$_2$,

A is alkylene having from 2 to 10 carbon atoms,

R$_4$ and R$_4$ may be the same or different and are lower alkyl, aryl, —CH=CH$_2$,

—(CH$_2$)$_n$NH$_2$, CF$_3$, —CONH$_2$

R$_6$ is H, —CH$_3$—C$_2$H$_5$, y is an integer in the range of from about 1 to about 3, n is an integer in the range of from about 1 to about 50,000;

z is an integer in the range of from 1 to about 5000; or a salt thereof.

2. A poly(siloxane-pivalolactone) thermoplastic plastic elastomer according to claim 1 wherein R is H.

3. A poly(siloxane-pivalolactone) thermoplastic elastomer according to claim 1 wherein R$_1$ and R$_2$ are methyl.

4. A poly(siloxane-pivalolactone) thermoplastic elastomer according to claim 1 wherein R$_1$ and R$_2$ are phenyl.

5. A poly(siloxane-pivalolactone) thermoplastic elastomer according to claim 1 wherein R$_3$ is methyl.

6. A poly(siloxane-pivalolactone) thermoplastic elastomer according to claim 1 wherein A is propylene.

7. A poly siloxane-pivalolactone) thermoplastic elastomer according to claim 1 wherein R$_4$ and R$_5$ are each methyl.

8. A poly(siloxane-pivalolactone) thermoplastic elastomer according to claim 1 wherein R is H, R$_1$ and R$_2$ are each methyl or phenyl, R$_3$ is methyl, R$_4$ and R$_5$ are each methyl A is propylene and R$_6$ is H.

9. A method for preparing a poly(siloxanepivalolactone) thermoplastic elastomer comprising copolymerizing in a solvent an elastomeric polysiloxane containing a carboxylate salt group and pivalolactone in the presence of a medium which separates the cation well from said carboxylate anion, and converts the carboxylate anion into an initiator for copolymerization therewith of said lactone.

10. The method of claim 9 wherein said medium is 18-crown-6.

11. An article of manufacture comprising the copolymer of claim 2.

12. An article of manufacture according to claim 11 in the form of a fiber.

13. An article of manufacture according to claim 11 in the form of a film.

14. An article of manufacture according to claim 11 in the form of a molded object.

* * * * *

UNITED STATES PATENT AND TRADEMARK OFFICE
CERTIFICATE OF CORRECTION

PATENT NO. : 4,985,511

DATED : January 15, 1991

INVENTOR(S) : Kenneth B. WAGENER, ET AL

It is certified that error appears in the above-identified patent and that said Letters Patent is hereby corrected as shown below:

In column 2, lines 40-45: delete the formula and substitute therefor:

-- 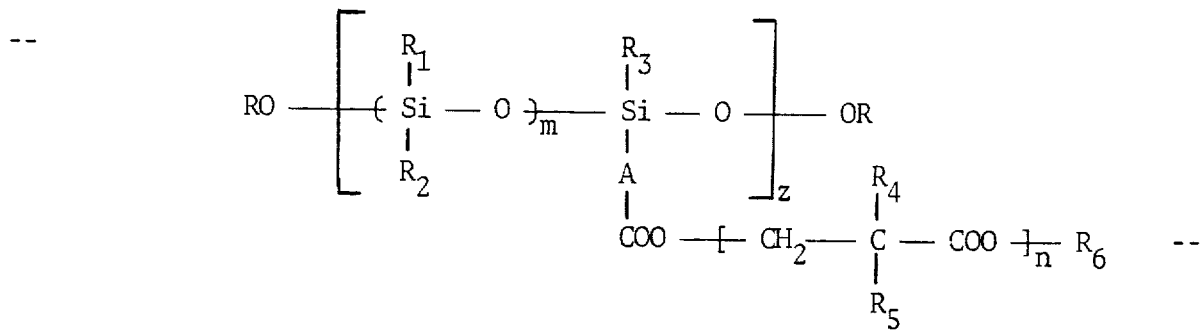 --

In column 4, line 59: delete "poly[pivalolactone)," and substitute -- poly(pivalolactone), --

In column 4, line 60: delete "where!-n" and substitute -- wherein --

In claim 1, column 7, delete the formula and substitute therefor:

-- 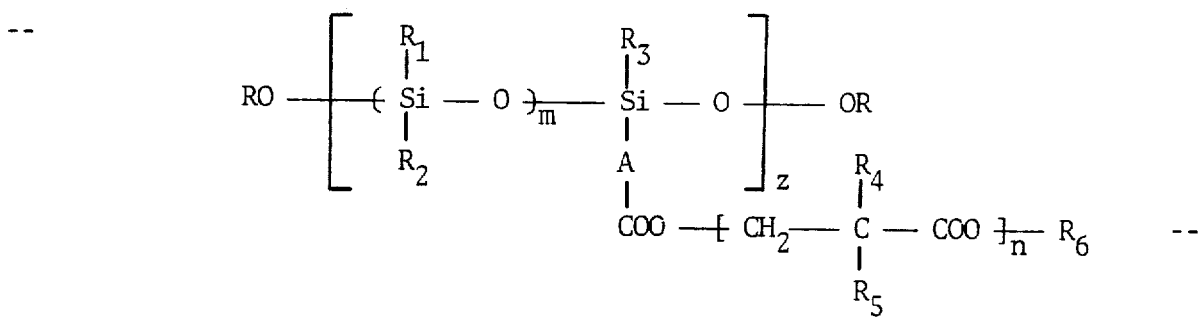 --

UNITED STATES PATENT AND TRADEMARK OFFICE
CERTIFICATE OF CORRECTION

PATENT NO. : 4,985,511

DATED : January 15, 1991

INVENTOR(S) : Kenneth B. WAGENER, ET AL

It is certified that error appears in the above-identified patent and that said Letters Patent is hereby corrected as shown below:

In claim 1, column 7, line 39: delete "$R_4$ and $R_4$" and substitute -- $R_4$ and $R_5$ --.

Col. 8:
In claim 2, lines 2-3: delete "plastic".

In claim 11, line 2: delete "claim 2" and substitute -- claim 1 --.

Signed and Sealed this

Twenty-first Day of July, 1992

Attest:

DOUGLAS B. COMER

Attesting Officer

Acting Commissioner of Patents and Trademarks